United States Patent Office 3,044,984
Patented July 17, 1962

3,044,984
PHOSPHORUS CONTAINING COMPOUNDS
Peter Richard Bloomfield, London, England, assignor to Microcell Limited, London, England, a company of Great Britain
No Drawing. Filed Dec. 14, 1959, Ser. No. 859,151
Claims priority, application Great Britain Dec. 15, 1958
6 Claims. (Cl. 260—61)

The invention relates to phosphorus containing compounds, and is particularly concerned with novel polymers and methods of making same.

According to the present invention there is provided a polymer having a structure containing phosphine, phosphine oxide or phosphine sulphide nuclei.

The polymer may be linear or cross-linked.

A typical linear polymer in accordance with the present invention has the formula

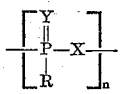

where R is a monofunctional hydrocarbon radical which can be aliphatic, alicyclic, aromatic, heterocyclic or substituted radicals of these types; X is a difunctional hydrocarbon group which can be aliphatic, alicyclic, aromatic, heterocyclic or substituted groups of these types; Y is an oxygen atom, a sulphur atom or is absent (i.e. the phosphorus is trivalent); and $n$ is an integer of from 3 to 10 or higher.

A typical cross-linked polymer in accordance with the present invention has the formula

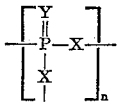

where X, which may be like or dissimilar, Y and $n$ are as defined above.

The present invention also includes a process for the preparation of polymers which process comprises condensing one or more difunctional organo-metallic compounds with one or more phosphorus compounds containing two halogen atoms other than fluorine atoms directly linked to the phosphorus atom.

The difunctional organo-metallic compound may be a dilithium compound, a disodium compound or a Di Grignard compound.

The phosphorus compound may be an organic dihalo phosphine, phosphine oxide or phosphine sulphide; the phosphorus compound is preferably phenyldichlorophosphine. Part or all of the phosphorus compound containing two halogen atoms may be replaced by an equivalent quantity of a phosphorus compound containing more than two halogen atoms bonded directly to the phosphorus atom. Preferably such a phosphorus compound containing more than two halogen atoms is phosphorus trihalide, phosphoryl trihalide or a thiophosphorus trihalide.

It is preferred that the difunctional organo-metallic compound is a phenylene 1:4 or 1:3 dimetallic compound. The linear condensation may be represented as follows:

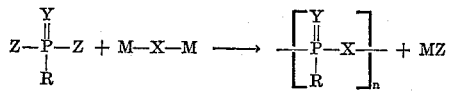

where X, Y and $n$ are as defined above; Z is a chlorine, bromine or iodine atom; and M is a lithium, potassium sodium atom or a Grignard radical MgZ, i.e. MgCl, MgBr or MgI.

The condensation may be effected by mixing one equivalent of the difunctional organo-metallic compound with from 0.8 to 1.2 equivalents of the phosphorus compound containing 2 halogen atoms. Preferably equivalent quantities of the two reactants are employed. The condensation may be carried out in a suitable solvent at temperatures in the range of −40° C. to 150° C. At the completion of the condensation reaction, the mixture is hydrolysed and the polymer isolated.

When the present invention is carried out with phosphorus compounds containing more than two halogen atoms bonded directly to the phosphorus atom, crosslinked polymers are produced.

Example 1

A solution of 15.5 gm. of phenyl phosphonic dichloride in 50 ml. of tetrahydrofuran was added dropwise to a well stirred solution of an equimolar quantity of phenylene 1:4 dilithium in tetrahydrofuran at −40° C. After the addition the reaction mixture was allowed to obtain room temperature and hydrolysed with water. The solvent was then steam distilled and the polymer separated from the aqueous phase and dried at 300° C. in vacuum to yield a pale yellow polymeric material. This polymer softened at 150° C., was soluble in ethyl alcohol and was stable at temperatures of about 300° C.

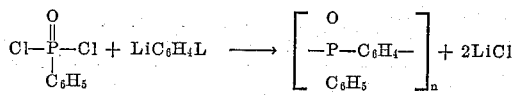

This new polymeric material possesses useful properties, for example (i) high thermal stability (ii) high softening point (iii) not supporting combustion and (iv) being linear, of good solubility in common volatile solvents.

Example 2

A mixture of 4.8 gm. of phenyl phosphonic dichloride and 3.7 g. of phosphorus oxychloride was dissolved in 50 ml. a 50/50 mixture of tetrahydrofuran and ether and added dropwise to a suspension of the disodium compounds prepared from 19.6 gm. of 44′ dibromodiphenyl ether in 100 ml. of the same solvent. After the addition, the mixture was refluxed for two hours with stirring. The mixture was then hydrolysed with water and steam distilled to remove volatile material. A light brown crosslinked resinous product was obtained. It was stable in air at temperatures of about 300° C.

Example 3

A solution of 7.9 gm. of phenyldichlorophosphine in 50 ml. of tetrahydrofuran was added dropwise to a suspension of the dilithium compound prepared from 13.3 gm. 1:10 dibromodecane, also in tetrahydrofuran. The mixture was then stirred for three hours at room temperature and hydrolysed with water. After removal of the solvent by steam distillation the polymer was separated and washed with water. It was soluble in hot aromatic solvents and softened about 100° C.

Example 4

A solution of 4.4 gm. of phosphorus oxychloride in 50 ml. of diethyl ether was added dropwise to a suspension of the diGrignard compound prepared from 10 gm. of 1:5 dibromopentene. The mixture was then stirred at room temperature for two hours and hydrolysed with water. After removal of the solvent by steam distillation the polymer was separated and washed with water. This cross-linked polymer was white in colour and was insoluble in organic solvents.

I claim:
1. A process for the preparation of phosphorus-containing polymers which process comprises mixing at least one difunctional organo-metallic compound having the formula M—R—M where M is selected from the group consisting of Na, K and Li atoms and MgCl, MgBr and MgI radicals, and R is an organic radical containing up to about 12 carbon atoms and selected from the group consisting of an aliphatic hydrocarbon radical and an aromatic radical containing only carbon, hydrogen and inert oxygen atoms; with at least one equivalent of at least one organo-phosphorus compound having the formula selected from the group consisting of

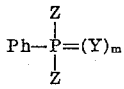

and

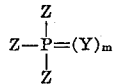

where Ph is a phenyl radical, Y is selected from the group consisting of sulphur and oxygen, Z is selected from the group consisting of chlorine, bromine and iodine, and $m$ is an integer from 0 to 1, in an inert solvent; maintaining the mixture at a temperature of from about $-40°$ C. to $150°$ C. so as to effect reaction; hydrolyzing the reaction mixture with water; and recovering the resultant polymer from the liquid phase.

2. The process of claim 1 wherein said inert solvent is selected from the group consisting of diethyl ether and tetrahydrofuran.

3. The process of claim 1 wherein said inert solvent is distilled from the reaction mixture after hydrolysis of the latter and said polymer is separated from the aqueous phase.

4. A process for preparing substantially linear phosphorus-containing polymers according to claim 1 wherein said organo-phosphorus compound has the formula

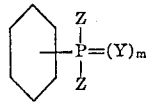

wherein Z, Y and $m$ have the same significance as in claim 1.

5. The process of claim 4 wherein said organo-metallic compound and said organo-phosphorus compound are mixed in proportions having a ratio of 1:0.8–1.2 on an equivalent weight basis.

6. A process for the preparation of polymers which contain only phosphorus and carbon atoms in the polymer backbone which method comprises adding a solution of from 0.8 to 1.2 equivalents of phenyl phosphonic dichloride in tetrahydrofuran to a solution of an equivalent of phenylene 1:4 dilithium in tetrahydrofuran at a temperature between $-40°$ C. and room temperature, allowing the reaction mixture to reach equilibrium at room temperature, adding water to the mixture, distilling off the tetrahydrofuran and separating the resultant polymer from the aqueous phase.

References Cited in the file of this patent
FOREIGN PATENTS
1,167,050   France _____ July 7, 1958